Jan. 29, 1924.
R. S. FLEMING
DESICCATING PROCESS
Filed Feb. 24, 1922
1,481,893
3 Sheets-Sheet 1
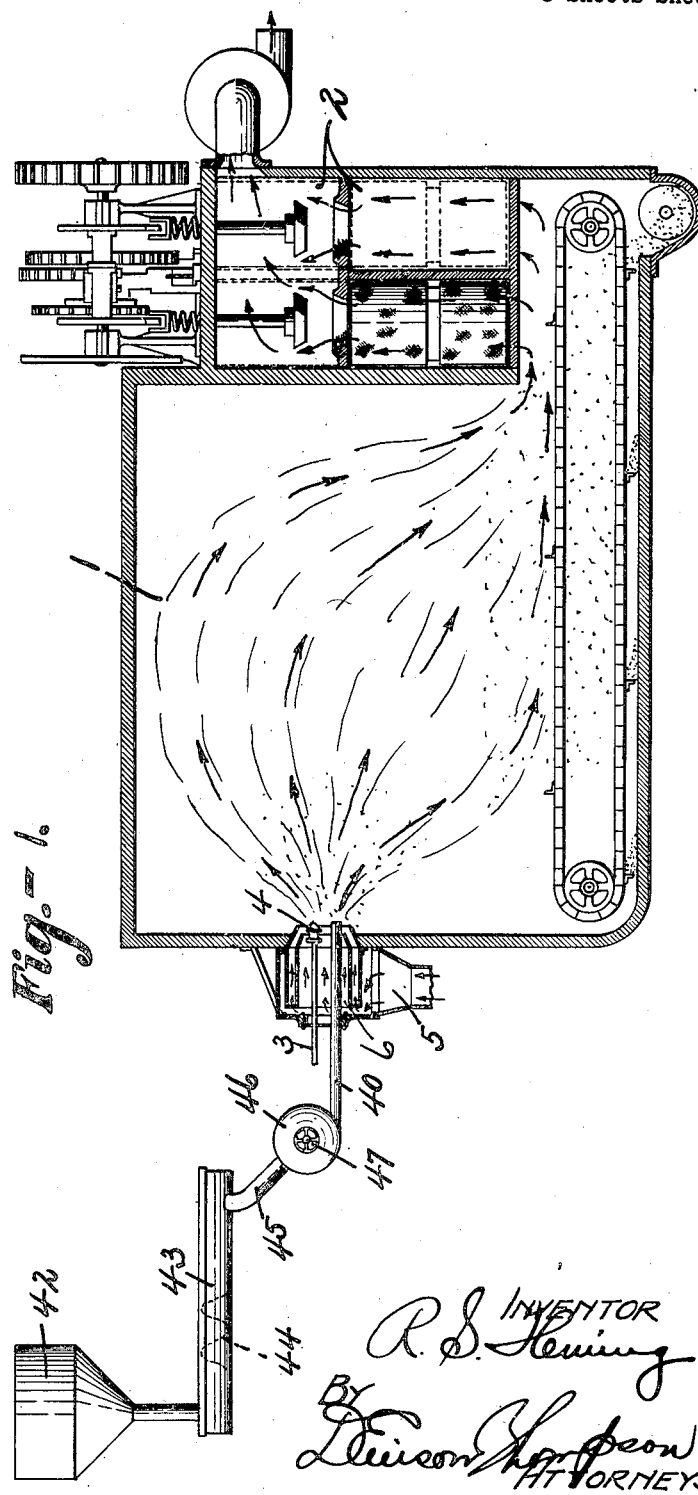

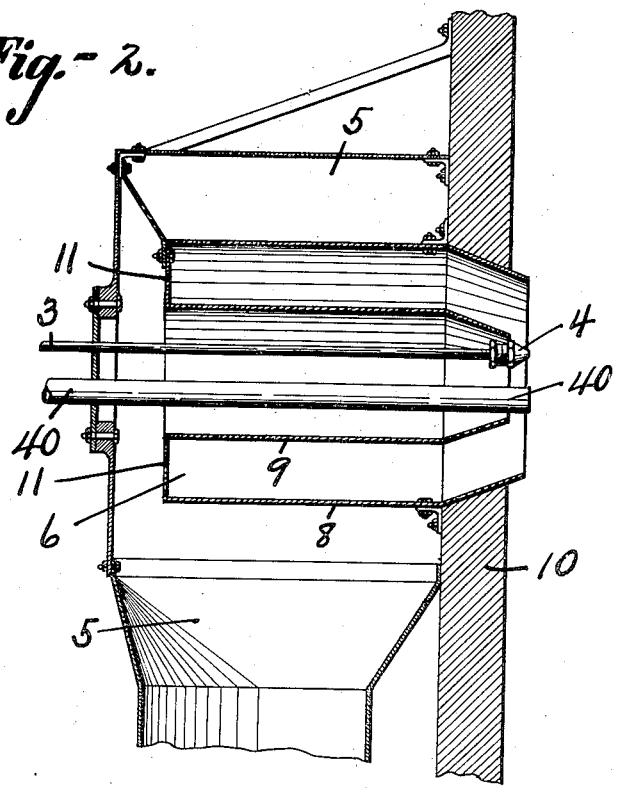
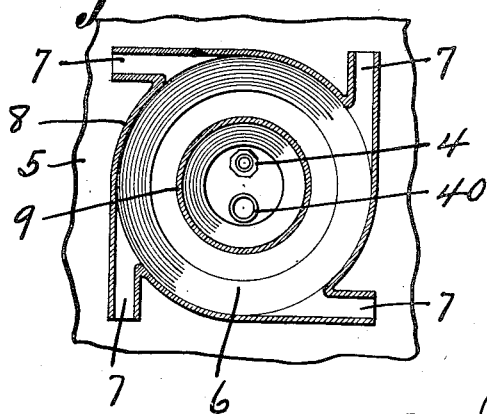

Jan. 29, 1924.  1,481,893
R. S. FLEMING
DESICCATING PROCESS
Filed Feb. 24, 1922   3 Sheets-Sheet 3
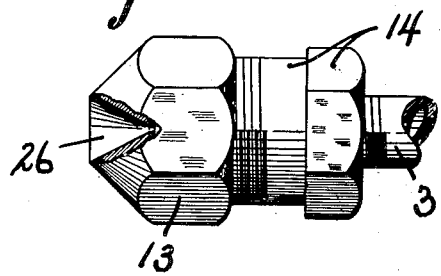
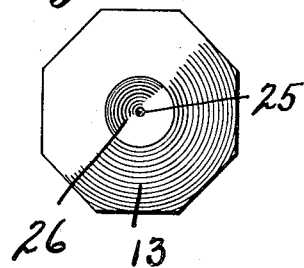
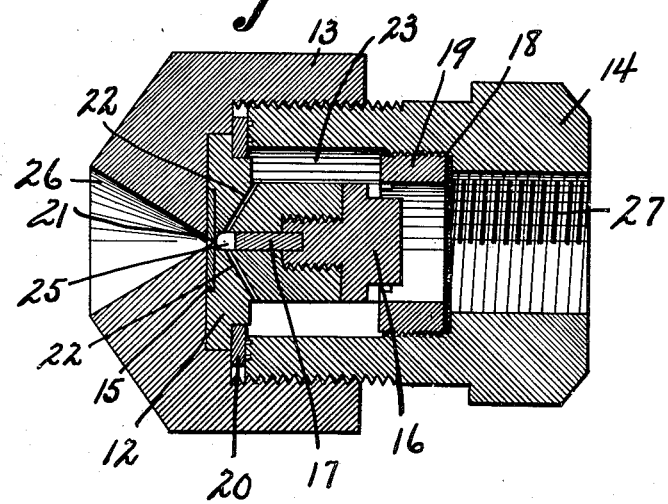

Patented Jan. 29, 1924.

1,481,893

UNITED STATES PATENT OFFICE.

RAPHAEL S. FLEMING, OF SYRACUSE, NEW YORK, ASSIGNOR TO MERRELL-SOULE COMPANY, OF SYRACUSE, NEW YORK, A CORPORATION OF NEW YORK.

DESICCATING PROCESS.

Application filed February 24, 1922. Serial No. 538,922.

*To all whom it may concern:*

Be it known that I, RAPHAEL S. FLEMING, of Syracuse, in the county of Onondaga, in the State of New York, have invented new and useful Improvements in Desiccating Processes, of which the following, taken in connection with the accompanying drawings, is a full, clear, and exact description.

This invention relates to a new method of desiccating a liquid solution, or for combining and desiccating a liquid and a solid, and to the apparatus utilized for carrying out that process.

There are many substances, such as fruit juices that cannot practically be reduced to and maintained in powder form due to their unstable hygroscopic nature, and perhaps for other reason, and it is quite essential to the production of a stable powder, that the juice be combined with some suitable substance, which may be termed a "drying promoter" or "stabilizer" if the resultant product is to be of a required stable character.

It has heretofore been proposed to mix fruit juice with starch, or some product of hydrolyzed starch, such as glucose or corn syrup previous to desiccation by the spraying process, that is, by atomizing the so formed solution into a current of moisture absorbing air whereby the liquid constituents are substantially completely vaporized and the solids collect in the form of a stable fruit juice powder.

I have discovered that a stable, and in some instances, superior powder can be produced by atomizing the fruit juice such as the juice of the citrous fruit into an atmosphere laden with the dust of a compatible material, such as starch, and that process constitutes the subject matter of the invention hereinafter claimed.

The details of an apparatus for carrying out this process in a preferred manner are disclosed in the accompanying drawings, in which:

Figure 1 is a sectional view of such apparatus.

Figure 2 is an enlarged sectional view of the air introducing device.

Figure 3 is a section of the air introducing device taken at right angles to Figure 2.

Figure 4 is a side elevation of a suitable spray nozzle.

Figure 5 is an end elevation of the same.

Figure 6 is a longitudinal section of the same.

The general form of the desiccating chamber and collector disclosed in Figure 1 is substantially the same as the structure disclosed in Letters-Patent No. 1,088,436 issued Feb. 24, 1914, to Merrell-Soule Company as the assignor of I. S. Merrell, while the air introducing devices are substantially the same as those disclosed in Letters Patent No. 1,102,601, issued to Merrell-Soule Co., as the assignor of I. S. Merrell and O. E. Merrell and the spray nozzle shown is substantially the same as that disclosed in Letters Patent No. 1,183,393 issued to Merrell-Soule Company as the assignor of I. S. Merrell and O. E. Merrell.

The desiccating devices comprise a desiccating chamber —1— of any suitable form and shape having a suitable screened outlet or dust collector —2—, the construction of the latter being substantially the same as that shown in said Letters Patent referred to. The liquid substance, such as the juice of a citrous fruit, may be forced under high pressure through a pipe —3— terminating in a spray nozzle —4— by means of which such juice is divided into infinitesimal particles. This atomized or sprayed solution is injected into a current of heated air introduced through the air-conveying devices and simultaneously commingled and combined with the powdered or dusting material which is ejected from the pipe —40— in a manner to be hereinafter described. The atomized juice and the powder are intimately mixed, commingled and combined, and when combining are subjected to the action of the said current of air whereby the liquid constituents of the combining substances are instantaneously practically and completely vaporized and the vapor is conveyed from the desiccating chamber preferably as stated through suitable screening devices, while the resultant practically dry powder gravitates to the floor of the desiccating chamber, or is collected and separated from the air by the screening device.

Preferably, the desiccating chamber in which the liquid is atomized contains an atmosphere laden with the dust of some compatible material. This floating powder may be any "stabilizer," "desiccation promoter" or desired material. The dust laden atmospheric condition of the chamber may be produced in any suitable manner, that shown being illustrative of one satisfactory method.

As shown, the dust or powdered material may be contained in a hopper —42— having its lower end discharging into a covered trough —43— which contains a conveyor —44— for conveying the powdered material through a discharge pipe —45— which leads to the axial inlet of a fan —46—. The opposite axial inlet —47— of the fan is adapted to admit air to be mixed with the powder entering the opposite side of the fan. The commingled air and powder being ejected through tangential pipe —40— and passing through the inner drum —9— of the wind-conveying devices as hereinafter described.

The air introducing devices shown comprise a wind trunk —5— through which heated air is forced by any suitable air blower or pump (not shown). This trunk communicates with an air whirling chamber —6— disposed intermediate the wind trunk and the desiccating chamber. This chamber —6— is preferably substantially circular in cross section and receives heated air under pressure from the trunk —5— through a plurality of tangential inlet inlet channels —7—. These channels are shown as four in number, equally spaced around the whirling chamber, and of substantially equal conveying capacity. Each channel may extend the length of the cylindrical part —8— of the chamber —6—. The air forced from the trunk —5— through these tangential channels is set into rapid whirling motion by the cylindrical walls —8— and —9— of said chamber. The axis of the chamber —6— is preferably horizontal and at substantially right angles to one of the walls —10— of the desiccating chamber —1—. This air whirling chamber may be formed by a pair of substantially concentric walls —8— and —9— connected at their rear by a transverse annular wall —11— each of said concentric walls having its forward end tapered forwardly to form an annular constricting outlet communicating with the desiccating chamber and preferably the taper of the wall —8— is somewhat greater than the taper of the wall —9— to further restrict the outlet and increase the pressure under which the air passes into the desiccating chamber. The wall —9— may terminate a short distance at the rear of the termination of the wall —10— and, as the wall —9— is open at its rear, it constitutes a substantially cylindrical chamber through which the pipe —3— passes to spray nozzle —4— and preferably the forward end of the spray nozzle is just in front of the termination of the wall —8—. This cylindrical chamber formed within the wall —9— communicates at its rear with the trunk —5— and acts to convey a direct current of air surrounding and enveloping the spray as it is injected into the dust laden atmosphere of the desiccating chamber. Preferably also the pipe —40— terminates adjacent the forward termination of the spray nozzle —4— so that the spray and the dusting material are intimately commingled and intermixed and combined, as they pass into the dust laden atmosphere of the chamber.

This construction is peculiarly efficient both in effecting instantaneous combination of the spray and dusting material, and also in effecting instantaneous and substantially complete vaporization of the liquid constituents of the atomized material, and in effecting an economy in space, due perhaps, to the rotary movement of the air and spray.

The spraying device as shown in Fig. 6 comprises a body —12—, a cap —13—, a casing —14— secured to the cap by threaded engagement in such a manner as to confine the body —12— between the cap —13— and the casing —14—. Further, the nozzle comprises a spray disk —15—, a plug —16—, a plug pin —17—, a screen —18—, a screen supporting ring —19— and a washer —20— all arranged in substantially the manner disclosed in the aforesaid pattern so that the body —12— has a liquid whirling chamber —21— at the middle of its outer side to which the liquid is conveyed by two ducts —22— which communicate at their outer ends with the chamber —23— of the casing. The spray disk has a minute central orifice —25— communicating with the whirling chamber —21— and leading to the evase ajutage —26— formed in the cap —13—. The casing —14— is interiorly threaded at —27— to receive the liquid conveying pipe —3— through which the liquid is forced under high pressure (as 2000 to 3000 pounds to the square inch) by any suitable means as a pump (not shown).

The operation of this particular desiccating apparatus is substantially as follows:— The air is introduced under pressure through the trunk —5— and forced into the desiccating chamber through the concentric chambers of the air introducing device in the manner heretofore described. The liquid is introduced into this current of heated air in atomized condition and is carried spirally forward by the heated air, and at the same time the dusting material or the powdered compatible material is introduced combined with air under some force through the pipe 40 into the desiccating chamber, and into the dust laden atmosphere of the chamber, and is combined and intermixed with the incoming atomized liquid solution to be dried and simultaneously with such combination the liquid constituents of the liquid solution are vaporized, and the resultant powder gravitates to the bottom of the desiccating chamber or is collected by the dust collecting or screening device —2— which permits the air and vapor to escape from the chamber separately from the dry powder, which is either retained in the desiccating chamber or within the collecting device, and in the use of this particular apparatus the powder collected in the device —2— is later deposited within the desiccating chamber and commingled with the powder primarily collecting therein.

In referring to the product of the spray process described herein as comprising or consisting of spherical particles, I mean to include particles constituting complete spheres or fragments thereof.

Altho I have described particular substances, such as fruit juice and starch as being adapted for combination and simultaneous desiccation by the process herein, it will be understood that the process is applicable to many and various substances, such as molasses and starch, or for simultaneously combining and desiccating any liquid substance with any powdered or dust making solid to produce a combined substantially dry product, the particular application of the process herein described being purely illustrative of suitable substances for the simultaneous combination and desiccation in the production of a desired and valuable product, and it will be obvious that altho I have described particular detailed steps as constituting a perhaps preferred embodiment of my invention, I do not desire to limit myself to the same, as many changes may be made in the details of the process and in the materials to which the same is applied, without departing from this invention as set forth in the appended claims.

I claim.

1. The process of desiccation comprising introducing a liquid in atomized form into an atmosphere laden with the dust of a compatible material, and simultaneously vaporizing the liquid constituents of the combining substance to reduce the combined solids to a powder.

2. The process comprising introducing a liquid in atomized form into a desiccating chamber containing an atmosphere laden with the dust of a compatible material, and introducing a current of moisture absorbing air into said chamber.

3. The process comprising introducing a liquid in atomized form into a desiccating chamber, introducing a powdered substance into said chamber, and subjecting the atomized liquid and powdered substance while combining to the action of a current of moisture-absorbing air to reduce the combined substance to a powder.

4. The process comprising introducing a liquid in atomized form into a desiccating chamber, introducing a dust laden current of air in said chamber and introducing a second current of air into said chamber to vaporize the liquid constituents of the combining atomized liquid and dust to reduce the combining substances to a powder.

5. The process of desiccation comprising combining an atomized liquid and a powder, and simultaneously desiccating the combining substances.

6. The process of desiccation comprising combining an atomized liquid and a powder, and simultaneously vaporizing the liquid constituents of the combining substances by a current of moisture-absorbing air.

In witness whereof I have hereunto set my hand this 16th day of February 1922.

RAPHAEL S. FLEMING.

Witnesses:

E. M. Fradenburgh,

Howard P. Denison.